United States Patent [19]

Scoubis

[11] 3,858,003

[45] Dec. 31, 1974

[54] EMITTER COUPLED SYNC SEPARATOR

[75] Inventor: John A. Scoubis, Forest Park, Ill.

[73] Assignee: Admiral Corporation, Chicago, Ill.

[22] Filed: Sept. 22, 1972

[21] Appl. No.: 291,224

[52] U.S. Cl. .............................. 178/7.35, 328/139
[51] Int. Cl. .............................. HO4n 5/08
[58] Field of Search .......... 178/7.35, 7.55; 307/235, 307/290; 328/115, 139

[56] References Cited

UNITED STATES PATENTS

| | | | |
|---|---|---|---|
| 2,890,352 | 6/1959 | Goodrich | 178/7.35 |
| 3,309,507 | 3/1967 | Schlein | 307/290 |
| 3,699,256 | 10/1972 | Roth | 178/7.35 |

OTHER PUBLICATIONS

"An Analysis of the Action of a Schmitt Trigger Circuit" in Electronic Engineering, January 1967, pp. 38–40 by D. W. H. Hampshire et al.

G. E. Transistor Manual, Seventh Edition, 1964, pages 199, 200.

Transistor Television Receivers, Towers, 1963, pages 96, 97.

*Primary Examiner*—Robert L. Griffin
*Assistant Examiner*—George G. Stellar
*Attorney, Agent, or Firm*—Hill, Gross, Simpson, Van Santen, Steadman, Chiara & Simpson

[57] ABSTRACT

An emitter coupled sync separator for a television receiver comprising a pair of transistors connected together with the first transistor receiving the composite video signal and gated to the on condition at a level which is approximately 50% of the height of the sync pulse and remains on until it is turned off at a time $t_2$ when the signal drops down to the same level again. The second transistor is coupled to the first transistor such that it is turned off when the first transistor is turned on. The input signal is coupled to the base of the first transistor through a parallel resistor and capacitor which determines the level at which the first transistor turns on and off. The circuit provides extremely fast response and is inherently immune to noise due to the very small window of the horizontal pulse. The circuit is capable of use over a wide range of amplitude of the composite video.

3 Claims, 5 Drawing Figures

EMITTER COUPLED SYNC SEPARATOR

BACKGROUND OF THE INVENTION

1. Field of the Invention

This invention relates in general to television circuits and in particular to a new and novel emitter coupled sync separator circuit.

2. Description of the Prior Art

Circuits for separating the synchronizing signal in television receivers have been known and have generally comprised a single transistor which is gated on and off in response to variation in the level of the composite video signal so as to separate the synchronizing signal by amplitude level. Such circuits are subject to noise and variations in amplitude of the composite video signal result in outputs of different amplitudes.

SUMMARY OF THE INVENTION

The present invention comprises an emitter coupled sync separation circuit for television receivers which comprises a pair of transistors coupled together with the first transistor being signal biased and turned on when the signal at the base of the transistor reaches a level of approximately one-half the amplitude of the sync signal and a second transistor coupled to the first transistor and turned off when the first transistor is turned on. A parallel resistance and capacitive circuit supplies an input to the base of the first transistor and the value of the resistor and capacitor determines the time constant of the circuit for determining the turn on and off points of the first transistor. The circuit provides extremely fast response and is simple in design and provides sync separation even if the percentage of sync drops below 10 percent of the total composite video. Because a very small window of the horizontal pulse is used, the noise immunity of the circuit is greatly improved over conventional known sync separator circuits. The circuit operates over a wide range of amplitude of the composite video signal and tests have shown that the circuit develops the same output with video signal variations varying from 0.6 to 4.0 volts peak to peak.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and, in which:

DESCRIPTION OF THE PREFERRED EMBODIMENTS

Figure 1:
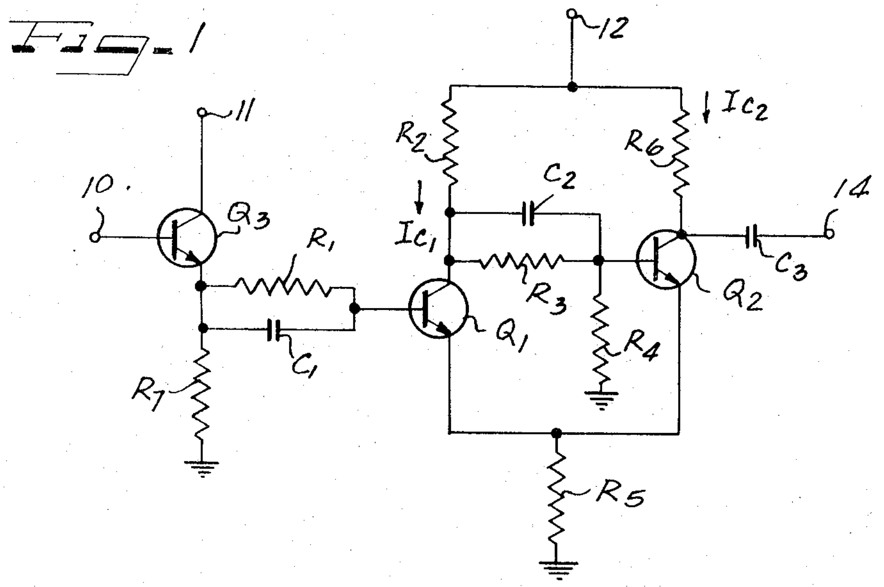
FIG. 1 is a schematic view of the sync separator of the invention.

FIG. 1 illustrates a transistor $Q_3$ whose base is connected to terminal 10 and collector is connected to terminal 11. The emitter of transistor $Q_3$ is connected to ground through a resistor $R_7$ and is coupled to the base of a first sync separator circuit transistor $Q_1$ through parallel resistor $R_1$ and capacitor $C_1$. The emitter of transistor $Q_1$ is coupled to ground through a resistor $R_5$ and its collector is coupled through a resistor $R_2$ to a terminal 12 to which a voltage is supplied. Terminal 12 is coupled through resistor $R_6$ to the collector of a second sync separator transistor $Q_2$ which has its emitter connected to the emitter of transistor $Q_1$. A resistor $R_3$ is connected in parallel with the capacitor $C_2$ between the collector of transistor $Q_1$ and the base of transistor $Q_2$. A resistor $R_4$ is connected between the base of transistor $Q_2$ and ground. An output coupling capacitor is connected between the collector of transistor $Q_2$ and the sync output terminal 14.

Figure 2A:
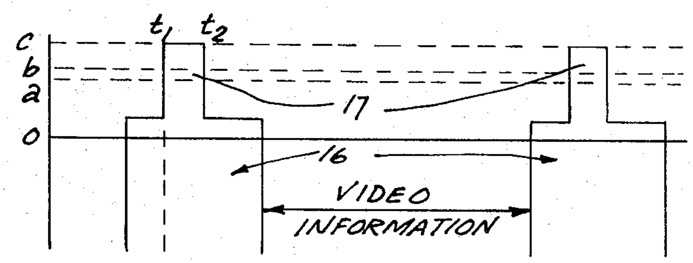
FIGS. 2A–2D illustrate wave shapes and signal levels at various points in the circuit of FIG. 1.

The transistor $Q_3$ may be the first video stage of a television receiver and supplies the composite video signal through the parallel circuit comprising the resistor $R_1$ and capacitor $C_1$ to the base of the transistor $Q_1$. The composite video signal is illustrated in FIG. 2A and includes a synchronizing signal of generally rectangular shape which has an amplitude level such that it is above the blanking level and the reference black level. The composite video information is designated generally as 16 in FIG. 2A and the horizontal sync portion is indicated by numeral 17. The transistor $Q_1$ is signal biased such that it is turned on when the signal on its base reaches a level a, indicated by dotted line, in FIG. 2A which has been selected to be at about the 50 percent point of the horizontal sync pulse so as to obtain linear performance between the minimum and maximum amplitude of the composite video. Thus the transistor $Q_1$ turns on when the signal applied to its base reaches the level *a* indicated in FIG. 2A at a time $t_1$ and remains on until time $t_2$ when the signal drops down to the level *a* at time $t_2$. Thus, the transistor $Q_1$ is on during the time interval $t_1$—$t_2$ and the transistor $Q_2$ is turned off during this time interval due to the drop in voltage at the base of the transistor $Q_2$ when transistor $Q_1$ conducts. The transistor $Q_2$ will be turned on at time $t_2$ when transistor $Q_1$ is turned off. Current $I_{C1}$ is in the saturation current of transistor $Q_1$ and $I_{C2}$ is the saturation current of transistor $Q_2$. Resistors $R_2$ and $R_6$ are chosen such that $I_{C1}$ is greater than $I_{C2}$. When the transistor $Q_1$ is off, the voltage across resistor $R_4$ is such that transistor $Q_2$ will be driven into saturation and the collector voltage of transistor $Q_2$ will be close to zero. When transistor $Q_1$ is turned on at time $t_1$ its collector voltage will start decreasing and the capacitor $C_2$ will start discharging through transistor $Q_1$ and the resistors $R_5$ and $R_4$ thus driving the voltage at the base of transistor $Q_2$ negative as shown by the trace in FIG. 2B. Pulse 15 illustrates the signal at the base of the transistor $Q_2$. When the voltage reaches the level *b* the transistor $Q_2$ is turned completely off and it remains off until the time $t_2$.

Figure 2B:
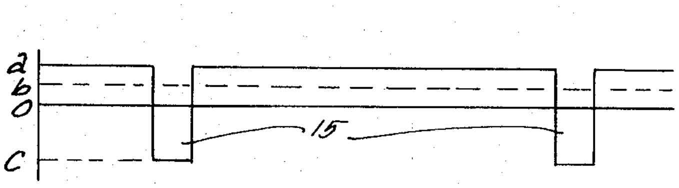
Figure 2C:
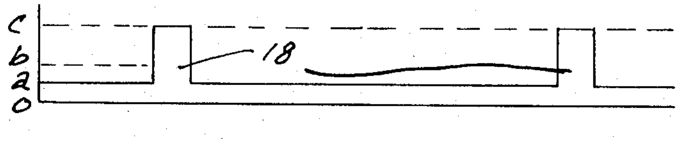

FIG. 2C illustrates the signal across the resistor $R_5$. During the time interval $t_1$—$t_2$ when the signal at the base of the transistor $Q_1$ passes through the levels *a*, *b* and *c*, transistor $Q_1$ conducts any pulse having an amplitude between a and c as illustrated in FIG. 2C if developed across the resistor $R_5$. This is true because the current $I_{C1}$ is greater than $I_{C2}$ and the capacitor $C_2$ discharges partially through the transistor $Q_1$ and resistors $R_5$ and $R_4$. The pulse 18 illustrated in FIG. 2C developed across the resistor $R_5$ will drive the emitter of transistor $Q_2$ more positive than during the conduction time of the transistor $Q_2$ and appears at a time when the base of transistor $Q_2$ begins to lose its positive voltage as is shown in FIG. 2B and thus transistor $Q_2$ will be turned off very fast.

Figure 2D:
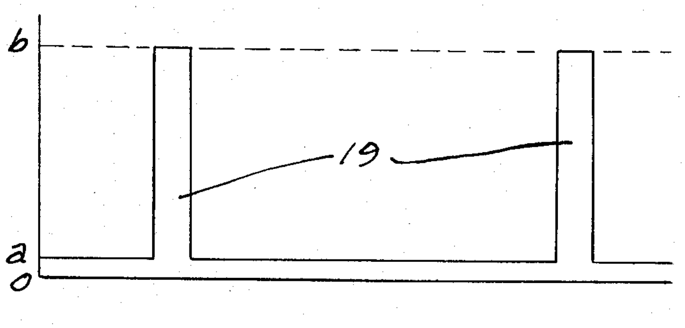

The result is that the output at terminal 14 and the collector of transistor $Q_2$ will be as shown by FIG. 2D wherein the pulse 19 is a small window (*a*, *b*) of the horizontal sync pulse (FIG. 2A) and is not subjected to a reversal of polarity.

The results of the circuit of this invention are that extremely fast response is obtained and the rise and fall time of the output signal is extremely short.

The circuit is simple in design and the values of the resistor $R_1$ and capacitor $C_1$ determines the point of level *a*. The time constant $R_3C_2$ is not critical as long as it is several times greater than the time of the vertical sync pulse.

The circuit is inherently immune to noise due to the fact that a very small window of the horizontal pulse is used which results in superior noise immunity.

The circuit is capable of performing sync separation even if the percentage of sync drops below 10 percent of the total composite video.

The range of the amplitude of the composite video over which the circuit will perform is very wide and performance tests have shown that the circuit develops the same output with video signal variations over the range of 0.6 volts peak to peak.

In a particular circuit constructed and tested the following component values were used:

| | | |
|---|---|---|
| $R_1$ | 270 | K ohms |
| $R_2$ | 3.6 | K ohms |
| $R_3$ | 8.2 | K ohms |
| $R_4$ | 330 | ohms |
| $R_5$ | 12 | ohms |
| $R_6$ | 5.1 | K ohms |
| $R_7$ | 1.2 | K ohms |
| The value of capacitors: | | |
| $C_1$ | 0.1 | microfarad |
| $C_2$ | 5 | microfarads |
| $C_3$ | 0.1 | microfarad |

The value of voltage applied to terminal 12 was 25 volts and the transistors $Q_1$ and $Q_2$ were selected to have $\beta$ greater than 100.

Thus, the invention provides a sync separator circuit of improved performance and fast response which is inherently immune to noise. The circuit is capable of functioning even though the percentage of sync drops below 10 percent of the composite video. The circuit will perform over a very wide amplitude range of the composite video signal.

Although the invention has been described with respect to preferred embodiments it is not to be so limited as changes and modifications may be made which are within the full intent and scope as defined by the appended claims.

What I claim is:

1. A television receiver producing a composite video signal and including a sync separator circuit comprising: first and second transistors; an output terminal coupled to another electrode of the second transistor; a control electrode of said second transistor coupled to another electrode of said first transistor; an input terminal receiving said composite video signal, means for biasing connected to said first and second transistors such that when said composite video signal is applied to said input terminal said first transistor is biased to conduction during the sync pulse and the second transistor is biased to cut off when the first transistor conducts and conducts when the first transistor is biased to cut off, a first capacitor and a first resistor connected in parallel between said input terminal and the control electrode of said first transistor and the time constant of said first resistor and capacitor determining the amplitude of said sync pulse at which said first transistor is biased to conduction, a second capacitor and a second resistor connected in parallel between the control electrode of said second transistor and said other electrode of said first transistor, third electrodes of said first and second transistors are connected together, said third electrodes are emitters, said control electrodes are bases and said other electrodes are collectors, said means for biasing includes a bias source, a third resistor connected between the other electrode of said first transistor and one side of said bias source, a fourth resistor connected between the other electrode of said second transistor and said bias source, the impedance of said fourth resistor is greater than that of said third resistor, said means for biasing further includes a fifth resistor connected between the control electrode of said second transistor and the second side of said bias source, said means for biasing further includes a sixth resistor connected between said third electrodes and said second side of said bias source, a third capacitor connected between said output terminal and the other electrode of said second transistor and wherein said first transistor is biased to start conduction in the range between 40–60 percent of the amplitude of the sync pulse.

2. A sync separator according to claim 1 wherein said first transistor is biased to start conduction in the range between 45–55 percent of the amplitude of the sync pulse.

3. A sync pulse separator according to claim 1 wherein said first transistor is biased to start conduction at the 50 percent point of the amplitude of the sync pulse.

* * * * *